United States Patent
Hara et al.

[11] Patent Number: 5,923,787
[45] Date of Patent: Jul. 13, 1999

[54] QUANTIZATION DEVICE AND METHOD, INVERSE-QUANTIZATION DEVICE AND METHOD, AND IMAGE PROCESSING DEVICE AND METHOD

[75] Inventors: Junichi Hara; Tadanori Ryu, both of Ikeda, Japan

[73] Assignee: Ricoh Company Ltd., Japan

[21] Appl. No.: 08/828,999

[22] Filed: Mar. 31, 1997

Related U.S. Application Data

[63] Continuation of application No. 08/308,283, Sep. 16, 1994, abandoned.

[30] Foreign Application Priority Data

Sep. 17, 1993 [JP] Japan .................................. 5-231610

[51] Int. Cl.⁶ .................................................. G06K 9/36
[52] U.S. Cl. ........................................ 382/251; 358/433
[58] Field of Search .................................. 382/239, 246, 382/250, 253, 251; 348/405, 414; 358/432, 433

[56] References Cited

U.S. PATENT DOCUMENTS

| | | | |
|---|---|---|---|
| 5,107,345 | 4/1992 | Lee | 358/432 |
| 5,241,395 | 8/1993 | Chen | 358/433 |
| 5,274,442 | 12/1993 | Murakami | 348/405 |
| 5,347,310 | 9/1994 | Yamada | 348/405 |
| 5,422,963 | 6/1995 | Chen | 358/433 |
| 5,452,104 | 9/1995 | Lee | 358/433 |

OTHER PUBLICATIONS

Habibi, "Survey of Adaptive Image Coding Techniques", IEEE Transactions on Communications, V25, No. 11, Nov. 1977, pp. 1275–1284.

Chen et al., "Adaptive Coding of Monochrome and Color Images", IEEE Transactions on Communications, V25, No. 11, Nov. 1977, pp. 1285–1293.

Chang et al., "Transform Coding of Arbitrarily–Shaped Image Segments", Proceedings 1st ACM International Conference on Multimedia, 1993.

Bi et al., "Discrete Cosine Transform on Irregular Shape for Image Coding", IEEE—TENCON '93, 1993.

*Primary Examiner*—Yon J. Couso
*Attorney, Agent, or Firm*—Knoble & Yoshida LLC

[57] ABSTRACT

A quantization device includes a multiplying unit for multiplying one of n×n values of quantization matrix information by a selected scale factor so as to provide quantization basis information.

The n×n values correspond to n×n pixels of a process block. These values are used as threshold values for quantization. A quantization operation unit for carrying out a quantization process on one of n×n orthogonal transformation coefficients uses the quantization basis information to provide a quantization coefficient, and a scale factor supplying unit for providing the noted one of the scale factors for the multiplying unit for using process location information which indicates a location in n×n matrix of the noted one of the n×n orthogonal transformation coefficients.

31 Claims, 18 Drawing Sheets

FIG.6
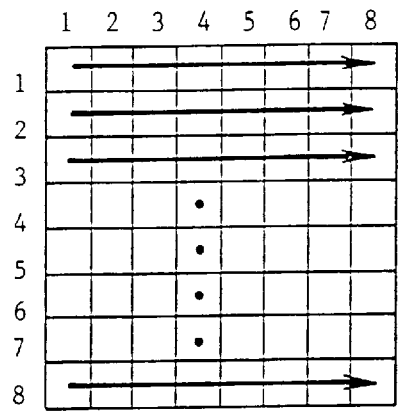
FIG.7
| | 1 | 2 | 3 | 4 | 5 | 6 | 7 | 8 |
|---|---|---|---|---|---|---|---|---|
| 1 | a | b | b | b | b | b | b | b |
| 2 | b | b | b | b | b | b | b | b |
| 3 | b | b | b | b | b | b | b | b |
| 4 | c | c | c | c | c | c | c | c |
| 5 | c | c | c | c | c | c | c | c |
| 6 | c | c | c | c | c | c | c | c |
| 7 | c | c | c | c | c | c | c | c |
| 8 | c | c | c | c | c | c | c | c |
FIG.8
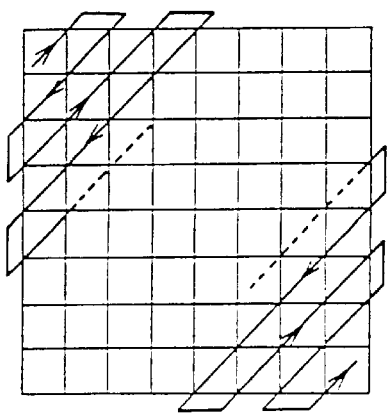

FIG.9
|   |   |   |   |   |   |   |   |
|---|---|---|---|---|---|---|---|
| a | b | c | d | e | f | g | h |
| b | c | d | e | f | g | h | i |
| c | d | e | f | g | h | i | j |
| d | e | f | g | h | i | j | k |
| e | f | g | h | i | j | k | l |
| f | g | h | i | j | k | l | m |
| g | h | i | j | k | l | m | n |
| h | i | j | k | l | m | n | p |
FIG.10
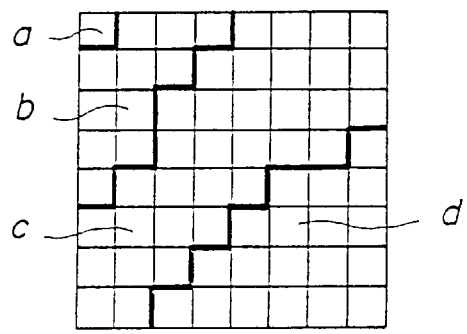
FIG.11
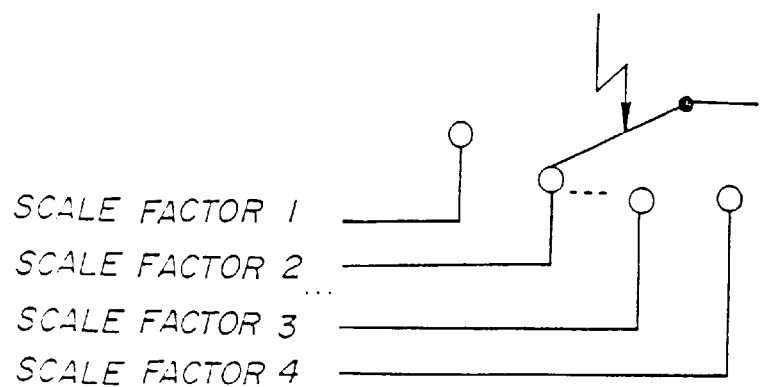

FIG. 26

PROVIDING SCALE FACTOR

- STORING LOCATION OR AREA INFORMATION DEFINING AREAS EACH FOR A SINGLE CORRESPONDING SCALE FACTOR TO BE USED — S31
- PROVIDING FIRST JUDGE SIGNAL REPRESENTING AN AREA WHICH INCLUDES A LOCATION POINTED BY PROCESS LOCATION INFORMATION — S32
- STORING GROUPING INFORMATION ABOUT GROUPS OF FIRST JUDGE SIGNALS — S33
- PROVIDING SECOND JUDGE SIGNAL REPRESENTING A GROUP WHICH INCLUDES THE FIRST JUDGE SIGNAL — S34
- SELECTING A SCALE FACTOR CORRESPONDING TO SECOND JUDGE SIGNAL — S35

MULTIPLYING SCALE FACTOR BY DATA OF QUANTIZATION TABLE AND CLIPPING RESULT TO PROVIDE QUANTIZATION BASIS INFORMATION — S36

CARRYING OUT INVERSE-QUANTIZATION PROCESS ON DECODED QUANTIZATION COEFFICIENT BY USING QUANTIZATION BASIS INFORMATION TO PROVIDE ORTHOGONAL TRANSFORM COEFFICIENT — S37

QUANTIZATION DEVICE AND METHOD, INVERSE-QUANTIZATION DEVICE AND METHOD, AND IMAGE PROCESSING DEVICE AND METHOD

This is a continuation of application Ser. No. 08/308,283, filed Sep. 16, 1994 now abandoned.

BACKGROUND OF THE INVENTION

1. Field of the Invention

The present invention in general relates to a device and a method for quantization and inverse-quantization in image processing and in particular relates to improved scale factors in quantization and inverse-quantization for improving images in devices such as facsimile machines, copy machines, electronic still cameras and the like.

2. Description of the Prior Art

FIG. 1 shows a block diagram of a prior-art image processing device which encodes and decodes moving picture data. In order to encode moving picture data, an input device generates moving picture signals in a Y, Cb or Cr format. A preprocessor 2 transforms these moving picture signals into a compatible format for an encoder 3. The encoder 3 reduces the amount of data to generate a bit stream without degrading the quality of the original moving picture data. A storage unit 4, such as a CD (Compact Disc), a DAT (Digital Audio Tape), or a hard-disc, stores the bit stream generated by the encoder 3.

Still referring to FIG. 1, in order to reproduce an image from the stored compressed bit stream, a decoder 5 first reads the stored moving bit stream from the storage unit 4 to generate reproduced image data. To reformat the reproduced image data to a compatible format to an output device 7, a postprocessor 6 performs a transformation process on the reproduced image data. The transformation process includes line interpolation, pixel interpolation, rate conversion, frame field conversion and aspect ratio conversion. The output device 7 displays a moving picture signal reproduced by the post-processor 6.

In recent years, a MPEG (Moving Picture Image Coding Experts Group) method has been proposed for the purposes of compressing and storing the moving picture data. In the MPEG method, a data compression method employed by the encoder 3 to generate compressed data generally includes steps of preprocessing, orthogonal transformation, quantization and entropy encoding. On the other hand, the decoder 5 performs a substantially reverse process of that performed by the encoder 3. That is, for example, entropy decoding, inverse-quantization and inverse orthogonal transformation are performed in order to decode a bit stream into an image.

FIG. 2 shows a block diagram of a quantization device to perform the above discussed quantization in the encoder 3 of FIG. 1. To perform quantization, as well known in the art, an input image is divided into a plurality of process blocks or units. Each process unit consists of, for example, an 8×8 group of pixels and is subject to an orthogonal transformation such as a DCT (Discrete Cosine Transform). During the transformation, a set of transform coefficients denoted by $C_{i,j}$ is necessary for each process unit.

The quantization device shown in FIG. 2 comprises a quantization table memory 303, a multiplying and clipping processing unit 301, and a quantization operation unit 302. The quantization table memory 303 is a semiconductor memory which stores quantization matrix information (sometimes referred to as a quantization table) used in a quantization process.

The multiplying and clipping processing unit 301 receives specified quantization matrix information $Q_{i,j}$ from the quantization table memory 303 and multiplies a scale factor SF by $Q_{i,j}$. The multiplying and clipping processing unit 301 further clips the above resulted product using a pair of predetermined upper and lower boundaries to generate quantization basis information $QSF_{i,j}$.

Finally, the quantization operation unit 302 performs a quantization operation on the transform coefficients $C_{i,j}$ and quantization basis information $QSF_{i,j}$ so as to provide quantization coefficients $QC_{i,j}$. The quantization information $QSF_{i,j}$ is a threshold value for quantizing an analog value such as the transform coefficients $C_{i,j}$.

FIG. 3 shows a block diagram of the inverse quantization device provided in the encoder 3 or the decoder 5. In order to prepare for the decoding of compressed image data, quantization table values $Q_{i,j}$ are provided for the multiplying and clipping processing unit 301, which multiplies a scale factor SF by the quantization table values $Q_{i,j}$ and then clips the product to generate $QSF_{i,j}$ for an inverse-quantization operation unit 502. At the same time, a decoded quantization coefficient $QC_{i,j}$ reproduced from the bit stream is supplied to the inverse-quantization operation unit 502 for performing an inverse-quantization process to generate transform coefficient $C_{i,j}$.

When the moving picture data is subject to data compression, a process block such as 8×8 pixels is treated in a stream of data at equal intervals. If the image data is compressed based upon only one quantization table, it is difficult to obtain a constant compression rate for different process blocks. In other words, compression may not be executed at a constant rate. In order to obviate this problem, the MPEG method described above adjusts a scale factor for each process block while using one quantization table so as to achieve a constant image compression rate.

When an orthogonal transformation is performed on image data, the result often tends to have a concentration of power on low frequency components. In light of this tendency, a weighted quantization table which is adapted to assign a greater number of bits to higher power frequency components is employed to compress information through the quantization process. By increasing the threshold values in the quantization table, a significantly improved data compression can be achieved. However, if these threshold values are too large, it will also result in degradation of the image quality. Furthermore, since a compression rate of this quantization process depends on the nature of the data, different quantization tables must be prepared for various data. Thus, in the prior art, a plurality of quantization tables and/or a plurality of scale factors are used to solve these problems.

In the prior art, however, even when a plurality of scale factors is used, threshold values in a quantization table are multiplied by the same scale factor. This means that every part of a processing block is equally treated. That is, a trivial part containing less image information is treated the same as a crucial part containing detailed image information in the same processing block.

Prior art techniques also attempted to adjust a single scale factor to modify a compression rate. If this method is employed, however, the same scale factor which is used for high frequency components is used for low frequency components as well. Since a quantization matrix may have a different threshold value for each of the 8×8 pixels, a quantization step for low frequency components is different from that for high frequency components. Nonetheless, when increasing a compression rate through the adjustment of the single scale factor, low frequency components are compressed by the same proportion as high frequency components. That is, every part of a process block is treated indiscriminately. Thus, for example, although a high compression rate can be achieved with a quantization table for a low compression rate by adjusting a single scale factor, the image quality obtained is degraded more than that obtained by simply using a quantization table for a high compression rate.

Accordingly, there is a need in the field of image processing involving quantization and inverse-quantization to prevent degradation of image quality and achieve constant compression rates.

SUMMARY OF THE INVENTION

Accordingly, it is a general object of the present invention to provide a quantization device and method, an inverse-quantization device and method, and an image processing device and method which can satisfy the above described need.

It is another and more specific object of the present invention to provide a quantization device and method, an inverse-quantization device and method, and an image processing device and method which prevent the degradation of image quality.

In order to achieve the above objects, a quantization device according to the present invention includes a multiplying unit for multiplying one of n×n values of a quantization matrix by one of the scale factors so as to provide quantization basis information, wherein the n×n values correspond to n×n pixels of a process block and are threshold values for quantization; a quantization operation unit for carrying out a quantization process on a selected one of n×n orthogonal transformation coefficients by using the quantization basis information to provide a quantization coefficient; and a scale factor supplying unit for providing the selected one of the scale factors for the multiplying unit by using process location information which indicates the location in an n×n matrix of the selected one of the n×n orthogonal transformation coefficients.

With this configuration, the scale factor supplying unit supplies within one process block different scale factors to be multiplied by quantization matrix information. Thus, the scale factor supplying unit discriminates important portions from unimportant portions of a process block as far as it uses the same quantization table, so that degradation of image quality is minimized even when using quantization matrix information of a low compression amount.

The scale factor supplying unit includes a location/area information unit for storing location/area information, which defines a particular scale factor to be used; a judge unit for judging which one of the areas includes a location pointed to by the process location information and for providing a first judge signal representing the area; and a scale factor first selection unit for selecting and providing a selected scale factor corresponding to the first judge signal for the multiplying unit. With this configuration of the scale factor supplying unit, a scale factor is selected from a plurality of scale factors, depending upon the location specified by the process location information. Thus, different scale factors can be provided based upon process location information.

In another configuration, the scale factor supplying unit includes a location/area information unit for storing location/area information, which defines areas for which a particular scale factor is to be used; a judge unit for judging which one of the areas includes a location specified by the process location information and for providing a first judge signal which represents the specified area; a grouping information store unit for storing grouping information about groups of the first judge signal, a grouping unit for providing a second judge signal representing one of the groups, which one includes the noted one of the first judge signals, wherein the grouping unit is connected to an output of the judge unit and to an output of the grouping information store unit; and a scale factor selection unit for selecting and providing the noted one of the scale factors corresponding to the second judge signal for the multiplying unit. With this configuration of the scale factor supplying unit, first judge signals can be grouped so that scale factors in a process block can have any desired arrangement simply by constructing appropriate group information.

In order to achieve the above objects and others, an inverse-quantization device according to the present invention includes a multiplying unit for multiplying one of n×n values of quantization matrix information by corresponding scale factor so as to provide quantization basis information, wherein the n×n values correspond to n×n pixels of a process block and are threshold values for quantization; an inverse-quantization operation unit for performing an inverse-quantization process on one of n×n decoded quantization coefficients by using the quantization basis information to provide an orthogonal transformation coefficient; and a scale factor supplying unit for providing the noted one of the scale factors for the multiplying unit by using process location information which indicates the location in an n×n matrix of the noted one of the n×n decoded quantization coefficients. With this configuration, the inverse quantization device can carry out an inverse quantization process on quantization coefficients supplied by the quantization device of the present invention.

Other objects and further features of the present invention will be apparent from the following detailed description when read in conjunction with the accompanying drawings.

BRIEF DESCRIPTION OF THE DRAWINGS

FIG. 6 illustrates a raster scanning sequence for obtaining orthogonal coefficients.

FIG. 7 illustrates one example of area divisions. Each area is denoted by a common alphabet, and a single scale factor is within the same area.

FIG. 8 illustrates a zigzag scanning sequence for obtaining orthogonal coefficients.

FIG. 9 illustrates an example of location/area information generated after zigzag scanning.

FIG. 10 illustrates another example of location/area information after zigzag scanning.

FIG. 11 illustrates one embodiment of a scale factor store device of FIG. 5.

FIG. 26 is a flow chart of the operation of the inverse-quantization device of FIG. 19 using the scale factor supplying unit of FIG. 12.

DESCRIPTION OF THE PREFERRED EMBODIMENTS

In the following, a device and a method for quantization and inverse quantization in image processing according to the present invention will be described in reference to the accompanying drawings. These devices and methods may be applied to the processing of both stationary and animated images.

Figure 1:
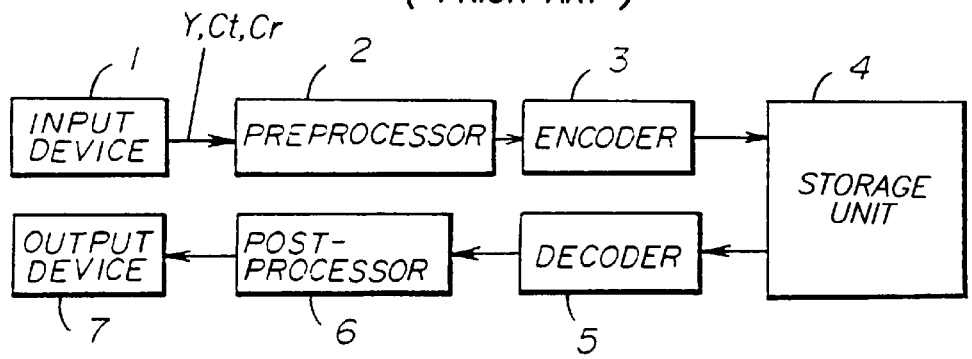
FIG. 1 is a block diagram of a prior art image processing device.
Figure 4:
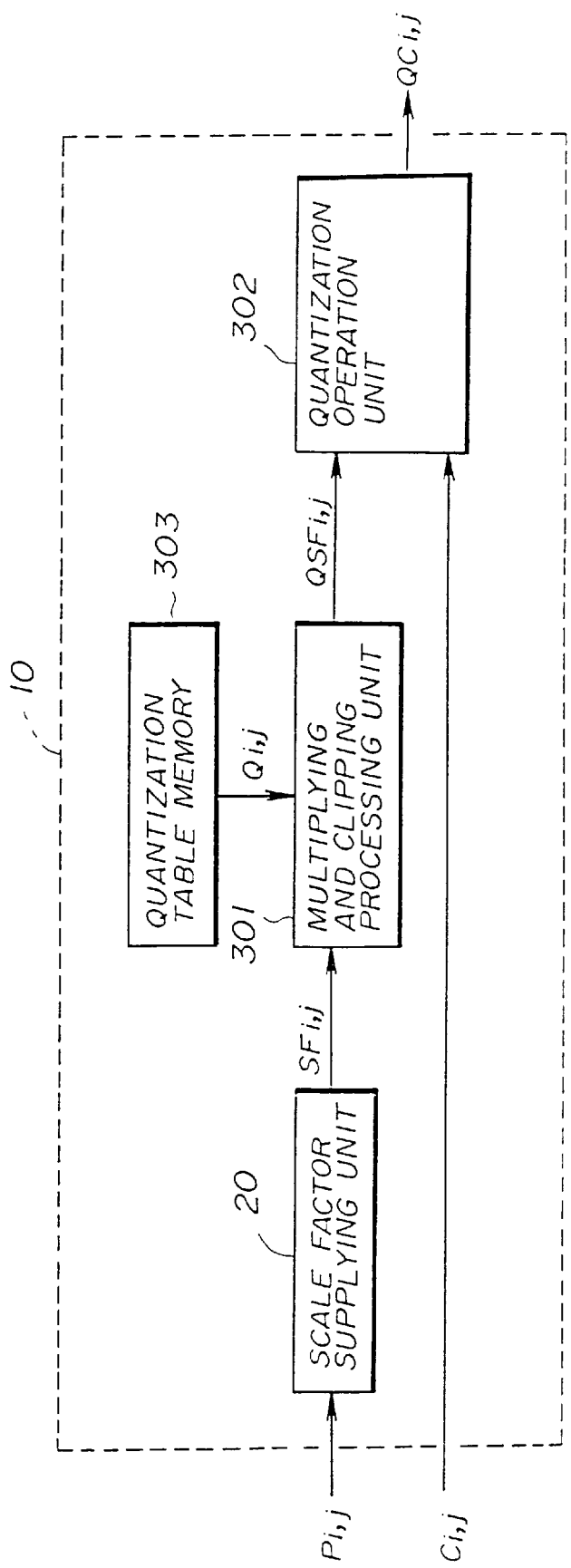
FIG. 4 is a block diagram of a quantization device according to the present invention.

First, a compression of stationary and animated image data will be described by using an example. FIG. 4 shows a block diagram of a quantization device 10 used in the encoder 3 of FIG. 1. Referring to FIG. 4, the quantization device 10 includes the same elements of FIG. 2 except for a scale factor supplying unit 20 and are referred to by the same numerals. $C_{i, j}$ are transform coefficients of a 8×8 matrix constituting a process block, and $P_{i, j}$ are location basis information provided by a location information supplying circuit (not shown) of an image processing device equipped with the quantization device 10. The location basis information specifies which one of the orthogonal coefficients of an 8×8 matrix is supplied to the quantization device 10. Here, the orthogonal coefficients of an 8×8 matrix obtained through an orthogonal transformation processing are provided in a predetermined order from the matrix to the quantization device 10.

Figure 2:
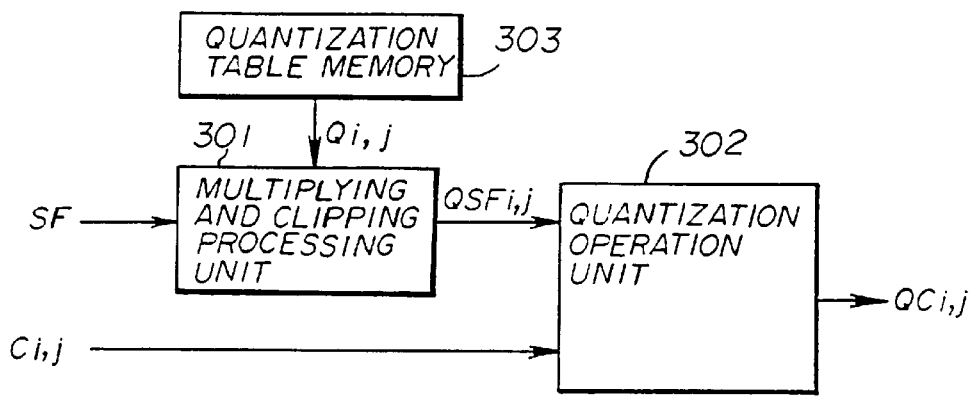
FIG. 2 is a block diagram of a prior art quantization device used in an encoder of FIG. 1.
Figure 3:
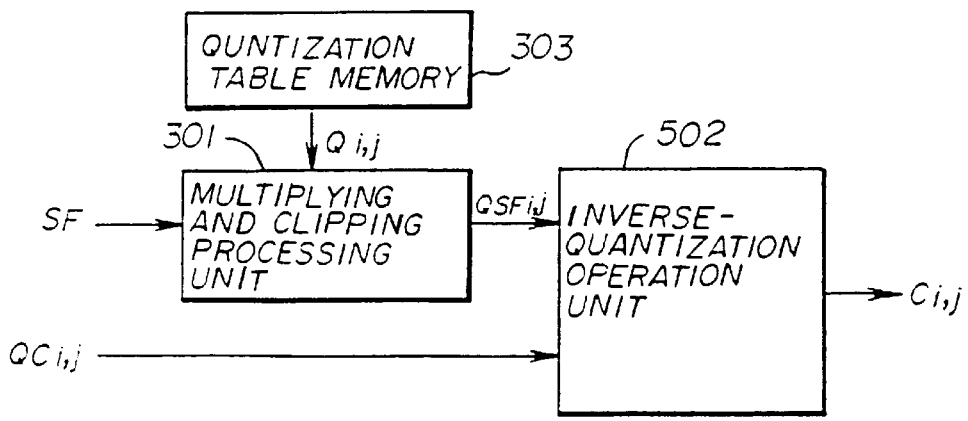
FIG. 3 is a block diagram of a prior art inverse quantization device used in a decoder of FIG. 1.

Still referring to FIG. 4, the quantization device 10 according to this embodiment includes a scale factor supplying unit 20 for receiving the location basis information $P_{i, j}$; the quantization table memory 303; the multiplying and clipping processing unit 301 connected to outputs of the scale factor supplying unit 20 and the quantization table memory 303; and the quantization operation unit 302. The quantization table memory 303, the multiplying and clipping processing unit 301, and the quantization operation unit 302 are the same as those of the quantization device in prior art as shown in FIG. 2.

As will be described later, when the quantization device according to the current invention processes orthogonal coefficients for a 8×8 matrix in one process block, it uses a different scale factor for each portion within one process block, instead of a single scale factor to multiply values of a quantization table as used in the prior art.

Figure 5:
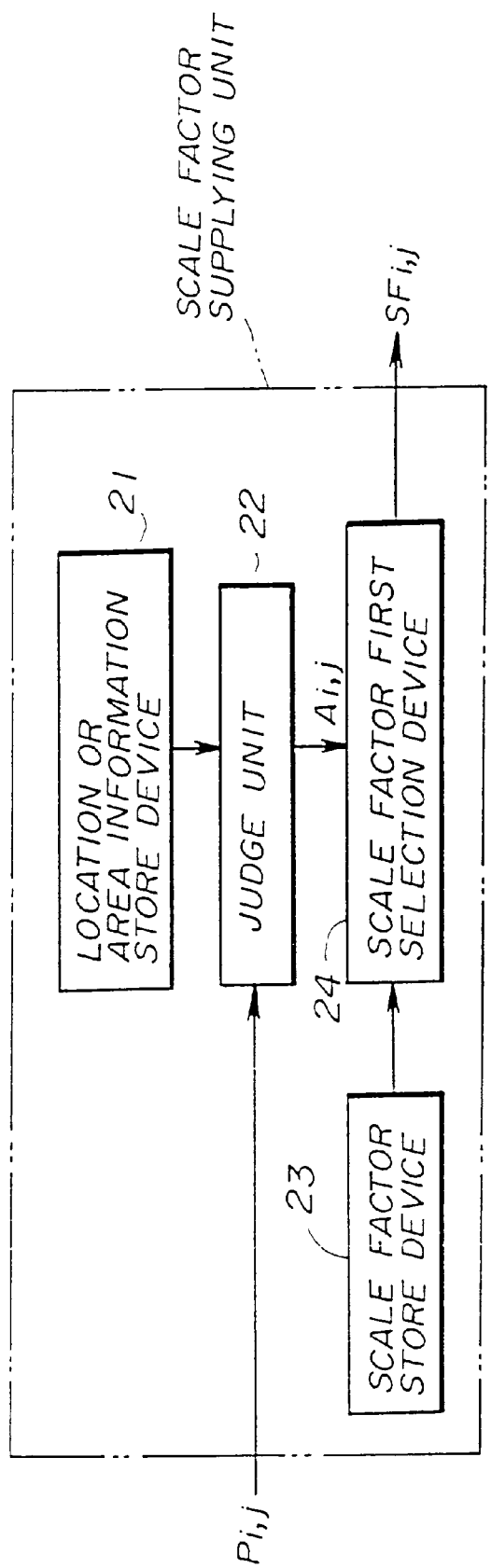
FIG. 5 is a more detailed block diagram of the scale factor supplying unit of FIG. 4.

A more detailed description of the scale factor supplying unit 20 will be given below. As shown in FIG. 5, the scale factor supplying unit 20 includes a location/area information store device 21; a judge unit 22 for receiving the location basis information $P_{i, j}$ and connected to the output of the location/area information store device 21; a scale factor store device 23 for storing a plurality of scale factors and comprised of a semiconductor memory; a scale factor first selection device 24 connected to the output of the judge unit 22 and the output of the scale factor store device 23. The output of the scale factor first selection device 24 is connected to the multiplying and clipping processing unit 301 of FIG. 4.

In order to perform a quantization operation on a process block, for example, of an 8×8 matrix, the location/area storage device 21 stores location/area information for indicating a location where a scale factor changes to another value or a group of locations where a single scale factor is to be applied. For example, if a process block is a 8×8 pixel matrix, each pixel can be expressed by row and column indices, where "rows" represent horizontal lines of the matrix ranging from 1 to 8 while "columns" represent vertical lines of the matrix ranging from 1 to 8.

In FIG. 6, raster scanning to provide orthogonal coefficients for the quantization device 10 involves a scanning sequence or a pattern from (1, 1) to (1, 8), from (2, 1) to (2, 8), from (3, 1) to (3, 8), . . . and then from (8, 1) to (8, 8).

FIG. 7 shows a pattern of divided areas. The same scale factor is used for each divided area that is denoted by the same letter. If areas are identified as shown in FIG. 7, the location/area information marks (1, 1), (1, 2) through (3, 8), and (4, 1) through (8, 8) as separate areas.

In the alternative, the location/area information also includes a plurality of locations or pixels to indicate separate areas. In other words, the location/area information contains only the last coordinates of the areas, instead of indicating the beginning and end pixels of an area in a scanning sequence. That is, in the above example, the area covering from (1, 2) to (3, 8) is indicated by (3, 8), and similarly the area covering from (4, 1) to (8, 8) is indicated by (8, 8).

A location/area information storage device 21 includes a semiconductor memory such as a ROM and a register. When only the last coordinate of an area is stored, a register may be used. In the alternative, the location/area information storage device 21 may also contain location information for each pixel. In this case, if a process block is comprised of 8×8 pixels, a total of 64 locations is stored in the location/area storage device 21. This individual location allows a scale factor to be modified for each pixel during a quantization operation as will be later described.

As shown in FIG. 8, a scanning sequence for providing orthogonal coefficients may be also zigzag. After the zigzag scanning, the location/area information storage device 21 contains the location/area information which may look as shown in FIG. 9. Area information is defined either by diagonal lines over a process block as shown in FIG. 8 or areas as shown in FIGS. 9 and 10. FIG. 10 shows different sizes of areas b, c, and d from corresponding areas in FIG. 9.

In order to implement image compression, a zigzag scanning sequence for orthogonal coefficients usually yields a superior image quality. Thus, the location/area storage device 21 generally stores information on separate areas as shown in FIG. 9 or 10. Even if orthogonal coefficients are provided in a raster scanning sequence, the scanning sequence is converted into a zigzag scanning sequence by using a process location conversion circuit and the like, which will be described later.

Referring back to FIG. 5, a judge unit 22 receives the location basis information $P_{i,j}$ from the location information supplying circuit and determines which area stored in the location/area storage device 21 includes the process location information $P_{i,j}$. Then, the judge unit 22 provides a first judge signal corresponding to the above determined location or area. To illustrate an example using FIG. 7, if the process location information $P_{i,j}$ is (2, 2), it belongs to the area ranging from (1, 2) to (3,8). Thus, in this example, the judge unit 22 provides a "b" signal, as a first judge signal. Another example is that if the process location information $P_{i,j}$ is (5, 4), which belongs to the area ranging from (4, 1) to (8, 8), the judge unit 22 outputs a "c" signal as a first judge signal.

If the location/area information storage device 21 stores the last coordinate of areas, the judge unit 22 compares the process location information $P_{i,j}$ with each area information. The judge unit 22 determines which area includes the process location information $P_{i,j}$, and outputs a first judge signal based upon the comparison.

Still referring to FIG. 5, the scale factor storage device 23 stores at least the same number of scale factors as the number of different first judge signals. The scale factor first selection device 24 selects a scale factor which corresponds to a first judge signal and sends the selected scale factor to a multiplying and clipping processing unit 301 as shown in FIG. 4. For example, assume that the scale factor storage device 23 contains scale factors of A, B, and C which respectively correspond to first judge signals a, b, and c. When the scale factor first selection device 24 receives a "b" signal as a first judge signal, it selects and sends out the scale factor of B. By the same token, when the scale factor first selection device 24 receives a "c" signal, it selects and sends out the scale factor of C.

One preferred embodiment of a first judge signal is an address signal indicating a memory location containing a corresponding scale factor in the scale factor storage device 23, and the scale factor first selection device 24 reads the selected scale factor stored at the indicated address of the scale factor storage device 23. The scale factor storage device 23 is not limited to a semi-conductor memory, but also includes elements each holding a scale factor and connected to a switching node as shown in FIG. 11. The scale factor selection device 23 turns on one of the switching nodes according to a first judge signal.

Figure 12:
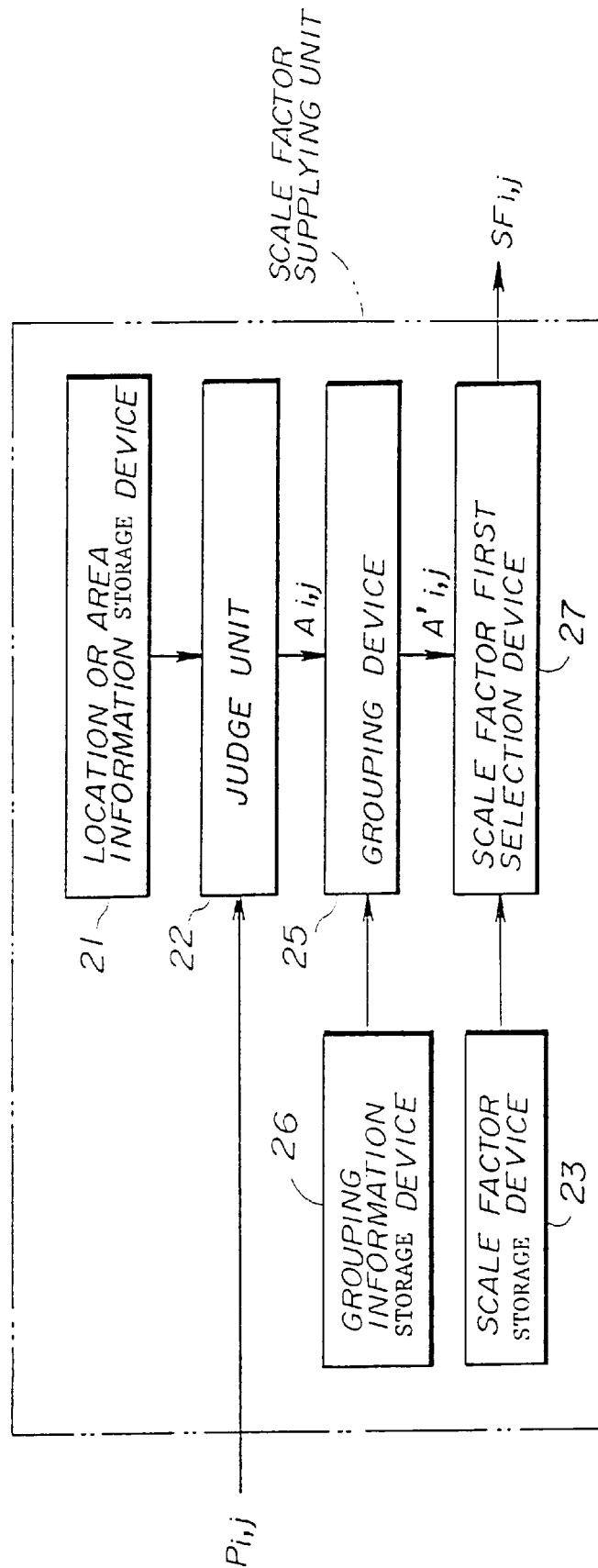
FIG. 12 is a block diagram of an alternative embodiment of the scale factor supplying unit of FIG. 4.

FIG. 12 shows a block diagram of another embodiment of a scale factor supplying unit 20 according to the current invention. In FIG. 12, the elements referred to by the same numerals in FIG. 5 perform substantially the same functions and will not be described. A grouping device 25 is connected to the output of the judge unit 22 and has its output to a scale factor selection device 27. A grouping information storage device 26 has its output connected to the grouping device 25. The grouping information storage device 26 stores information regarding the grouping of first judge signals such as the "α" and "β" signals to represent respectively a first group of the first judge signals "a" and "b" and a second group of the first judge signals "c" and "d."

By using grouping information provided by the grouping information storage device 26, the grouping device 25 determines as to which group includes a given first judge signal outputted by the judge unit 22 and sends its output, a second judge signal, to a scale factor first selection device 27. The second judge signal indicates which group includes the first judge signal. For example, if the "a" and "b" signals belong to the group α and the "c" and "d" signals belong to the group β as described above, the grouping device 25 outputs an α signal as a second judge signal when receiving the "a" signal from the judge unit 22. Similarly, when receiving the "d" signal from the judge unit 22, the grouping device 25 outputs a signal as a second judge signal.

Grouping is not limited to areas but also includes points dividing one group from another. If such grouping information is stored in the grouping information storage device 26, the grouping device 25 compares location information on a dividing point with a first judge signal provided from the judge unit 22, and selects a second judge signal as an output based on a result of the comparison.

Figure 13:
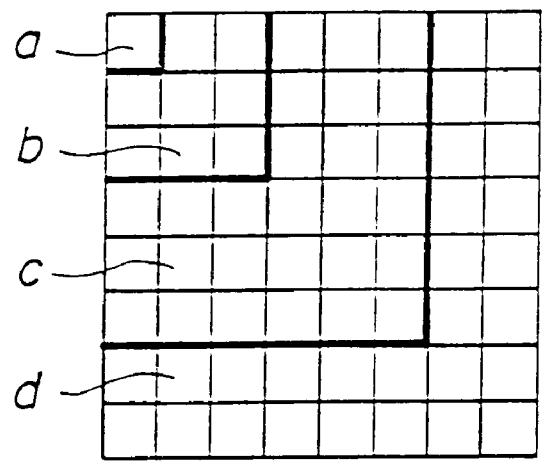
FIG. 13 illustrates an example of group location/area information according to this invention.
Figure 14:
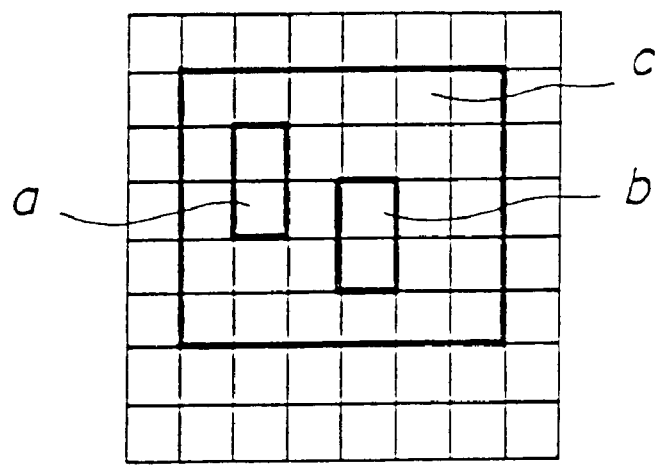
FIG. 14 illustrates another example of group location/area information.

The scale factor selection device 27 selects a scale factor based on a second judge signal such as an α signal and a β signal and sends the selected scale factor to the multiplying and clipping processing unit 301. Since first judge signals are grouped in the scale factor storage device of FIG. 12, scale factors also have such area configurations as shown in FIGS. 13 and 14.

Figure 15:
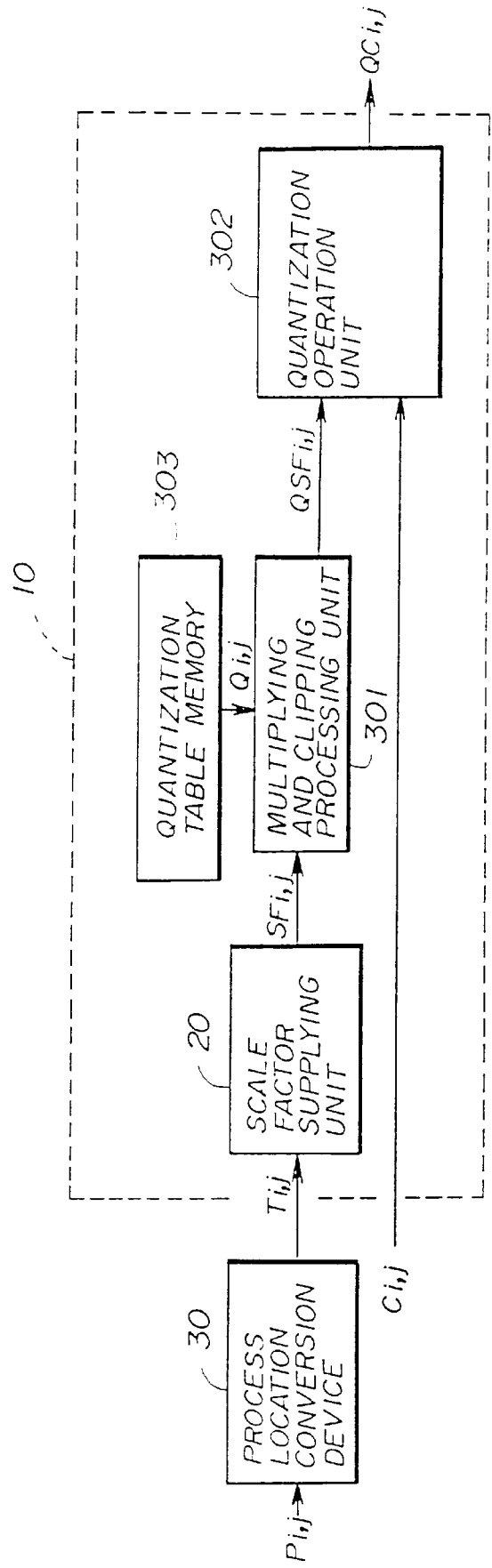
FIG. 15 is a block diagram of the quantization device with a process location conversion device for converting a scanning sequence from one format to another for obtaining scale factors.
Figure 16:
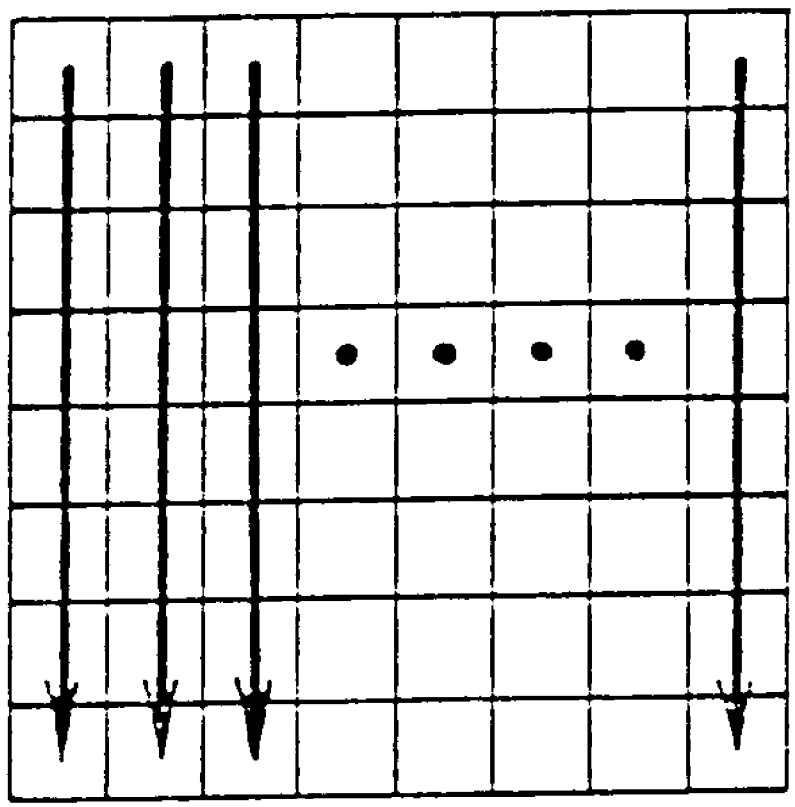
FIG. 16 illustrates a vertical scanning sequence for obtaining location/area information.

As shown in FIG. 15, a process location conversion device 30 is placed between the scale factor supplying unit 20 and the location information supplying circuit (not shown) that provides the location information $P_{i,j}$. The process location conversion device 30 converts an original scanning pattern of the location information $P_{i,j}$ into any desired scanning pattern. For example, if the location information $P_{i,j}$ is provided for the process location conversion device 30 in a horizontal raster scanning sequence as shown in FIG. 6, the process location conversion device 30 converts this scanning sequence into a zigzag scanning sequence as shown in FIG. 8 or into a vertical scanning sequence as shown in FIG. 16. By doing so, the process location conversion device 30 converts the location basis information $P_{i,j}$ into another process location information, $T_{i,j}$, which is then sent to the scale factor supplying unit 20.

Figure 17:
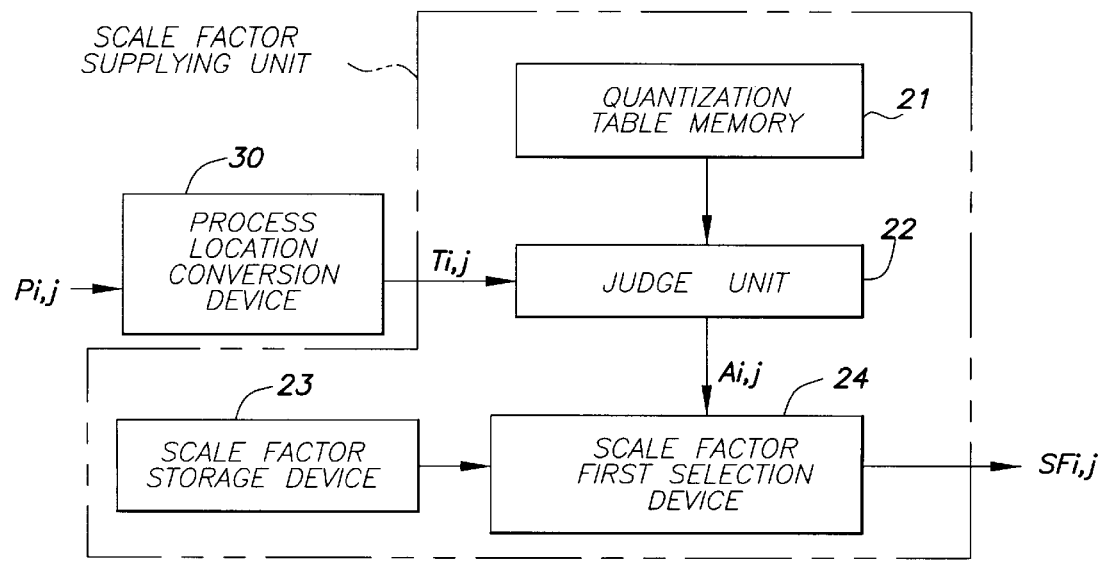
FIG. 17 is a block diagram of the scale factor supplying unit as shown in FIG. 5 with a process location conversion device.
Figure 18:
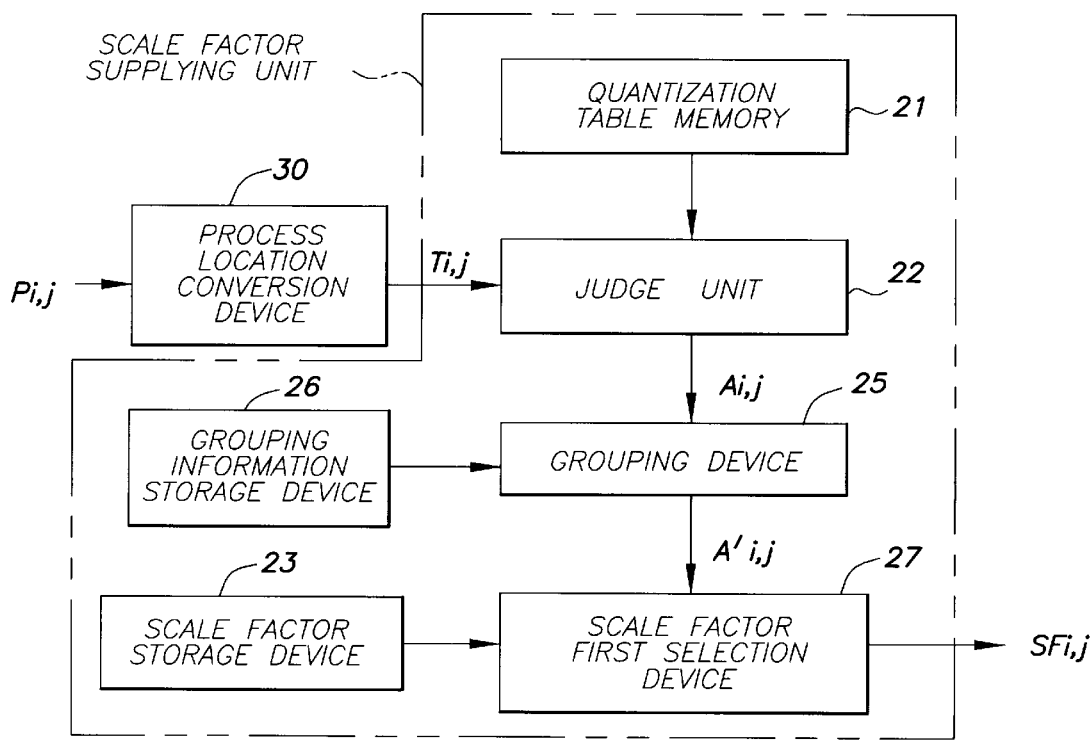
FIG. 18 is a block diagram of the scale factor supplying unit including a grouping device as shown in FIG. 12 along with a process location conversion device.

In FIGS. 17 and 18, the two embodiments of the scale factor supplying unit 20 respectively shown in FIGS. 5 and 12 are connected to a process location conversion device 30. In general, the location information in a raster scanning sequence is converted into a zigzag scanning sequence by the process location conversion device before being fed into the judge unit 22. This preprocessing by the process location conversion device 30 simplifies the circuit structure of the scale factor supplying unit 20 and in turn the quantization device.

Figure 19:
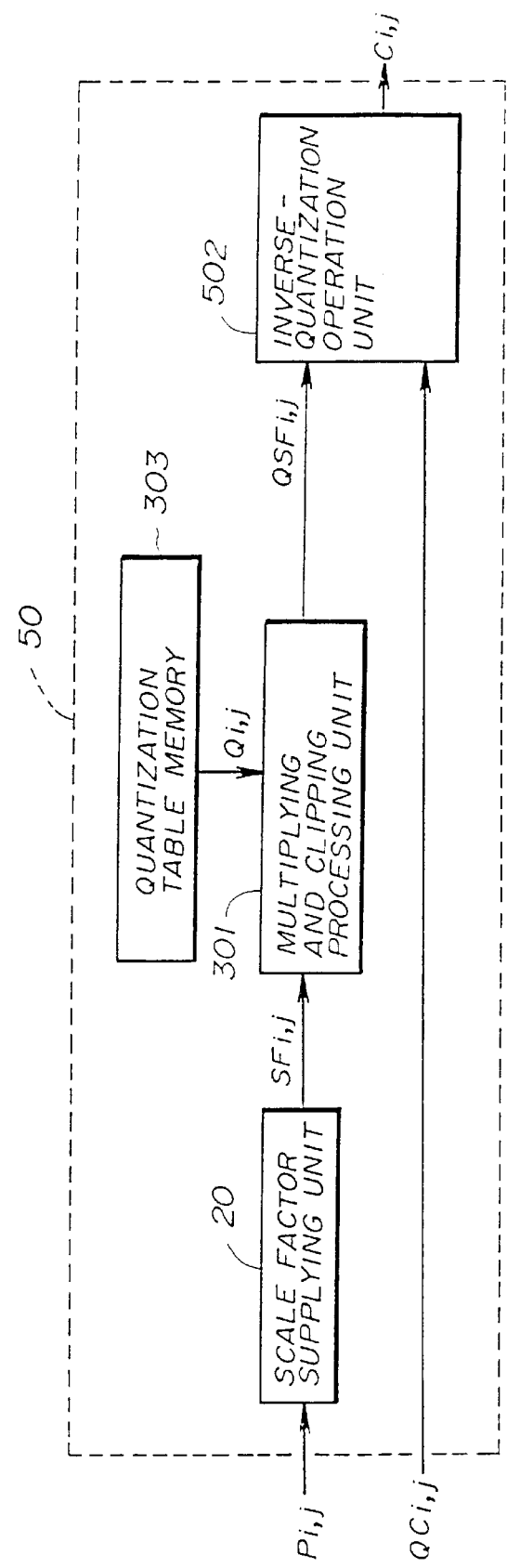
FIG. 19 is a block diagram of an inverse-quantization device according to the present invention.

In the following, the inverse-quantization device for decoding quantization coefficients supplied from the quantization device will be described. FIG. 19 shows one preferred embodiment of the inverse-quantization device 50 used in the decoder 5 of FIG. 1. The elements in the inverse-quantization device 50 referred by the same numerals perform substantially the same as those in FIG. 5 and will not be further described.

The inverse-quantization device 502 according to the current invention performs an inverse-quantization process on quantization coefficients which were generated by the quantization device 10 of FIG. 4. The quantization device 10 performs Huffman encoding processing to compress image data while the inverse-quantization device 50 performs Huffman decoding processing to decompress the compressed image data.

Still referring to FIG. 19, the inverse-quantization device 50 includes an inverse-quantization operation unit; the scale factor supplying unit 20; the quantization table memory 303; and the multiplying and clipping processing unit 301 connected to receive the output of the scale factor supplying unit 20. Except for the inverse-quantization operation unit, other elements perform substantially the same as those in the quantization device 10 as shown in FIG. 4. The above described preferred embodiment of the inverse-quantization device 50 performs an inverse-quantization process on quantization coefficients generated by the quantization device 10.

Figure 20:
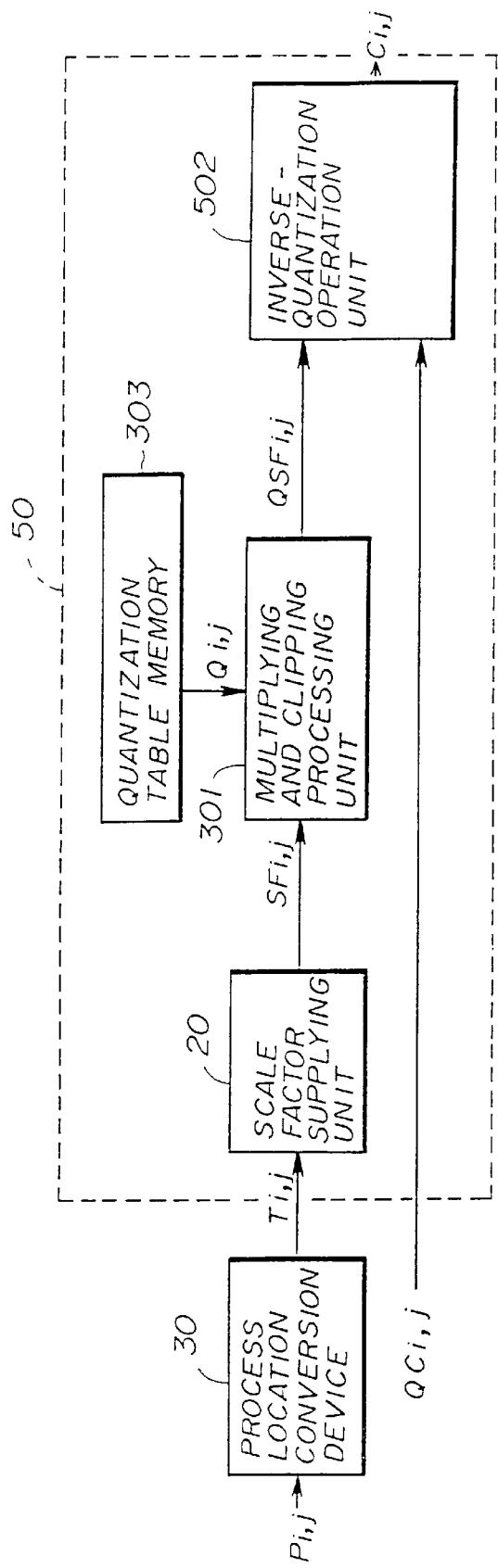
FIG. 20 is a block diagram of the inverse quantization device as shown in FIG. 19 with the process location conversion device.

FIG. 20 shows that the scale factor supplying unit 20 of the inverse-quantization device 50 is connected to the process location conversion device 30 for converting a scanning sequence as described in reference to FIGS. 17 and 18. The process location conversion device 30 in the inverse-quantization device 50 allows an inverse-quantization process to operate on quantization coefficients based on the process location information converted from the location basis information.

Figure 21:
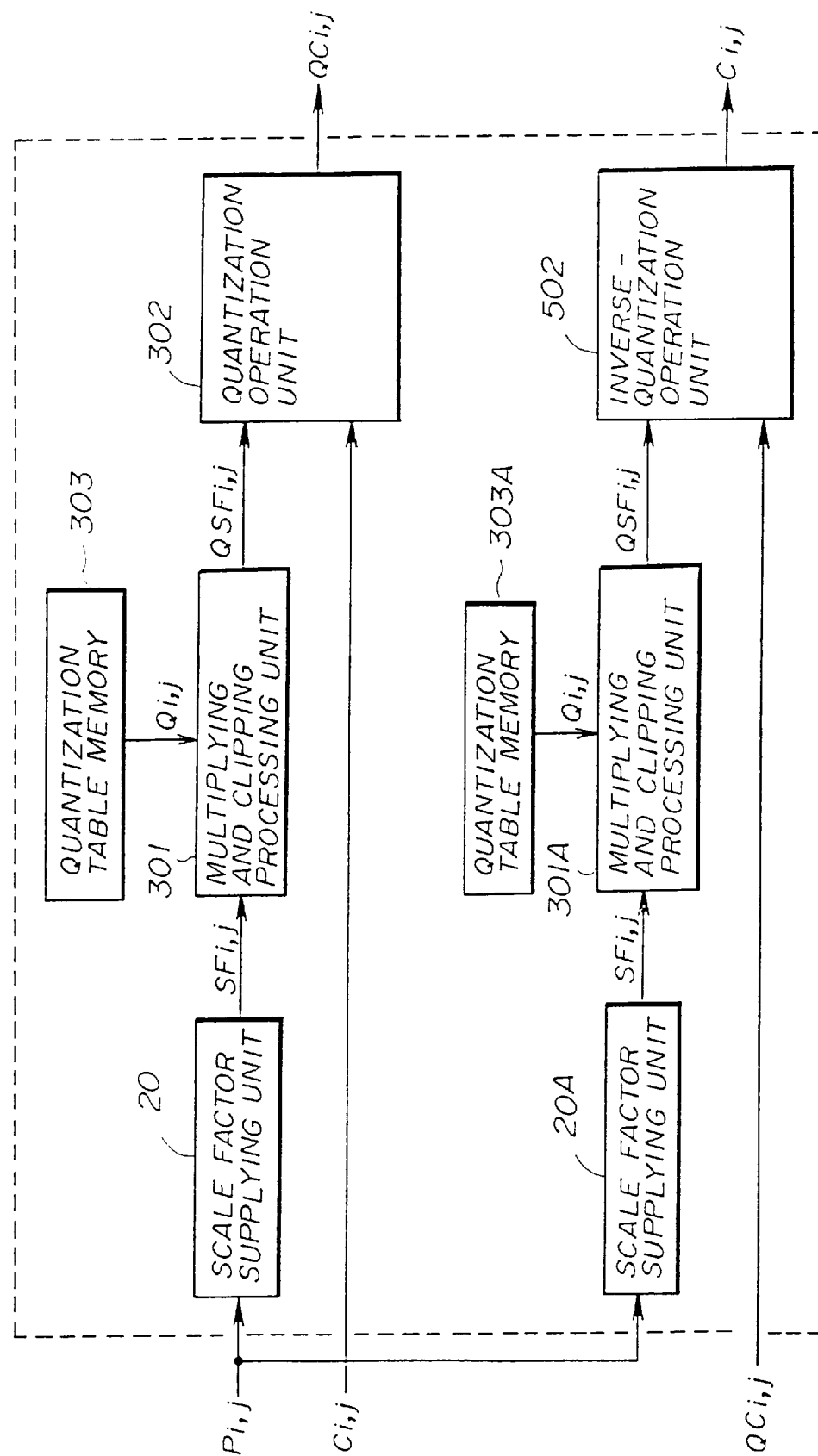
FIG. 21 is a block diagram of an image processing device according to the present invention.
Figure 22:
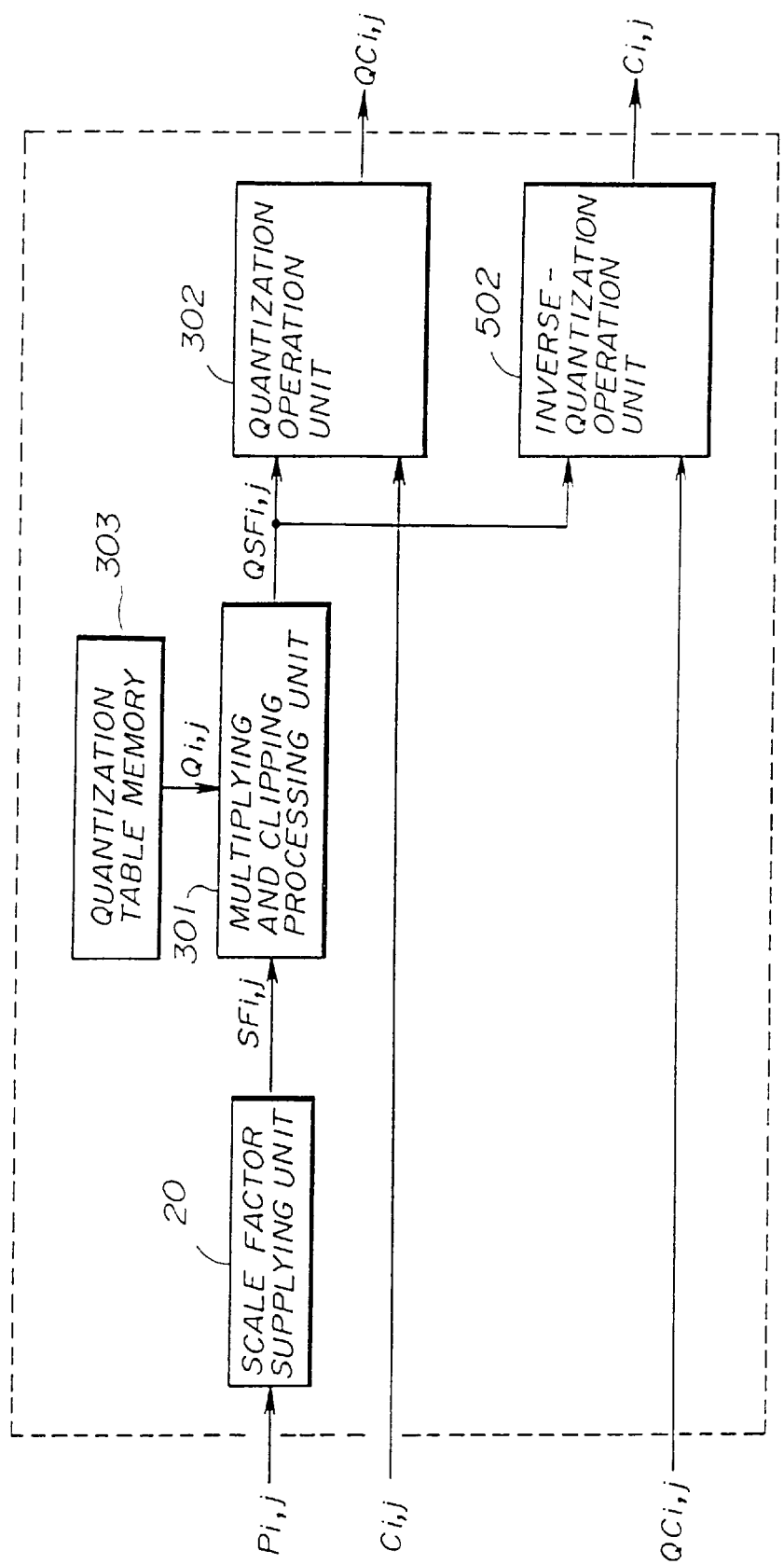
FIG. 22 is a block diagram of an alternative embodiment of the image processing device according to the present invention.

As shown in FIG. 21, it is possible to implement an image processing device by combining the quantization device 10 of FIG. 4 and the inverse quantization device 50 of FIG. 19. This combined image processing device shares the common components such as the quantization table memory, the multiplying and clipping processing unit, and the scale factor supplying unit as shown in FIG. 22.

In the following, an operation of the quantization device 10 will be described. As for the inverse quantization device 50, an operation for providing a plurality of scale factors is the same as that of the quantization device 10 and will not be described.

Figure 23:
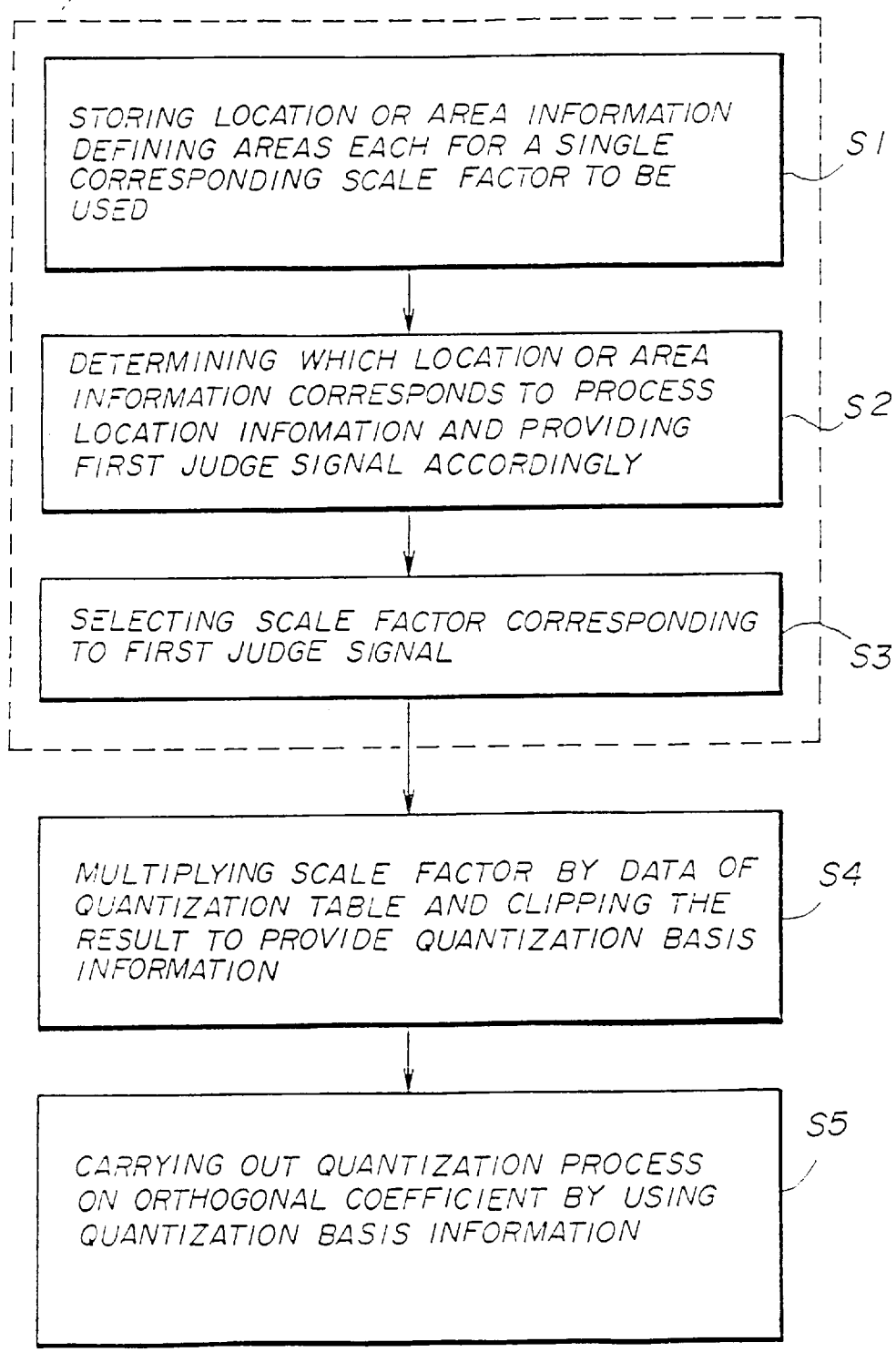
FIG. 23 is a flow chart of the operation of the quantization device of FIG. 4 using the scale factor supplying unit of FIG. 5.

As shown at Step S1 of FIG. 23, the location/area information storage device 21 of FIG. 5 stores location/area information either on points where a scale factor changes within a process block of an 8×8 pixel matrix or on areas for which a single corresponding scale factor is used.

After an orthogonal transformation process is performed on each pixel of a process block of input image data, orthogonal transformation coefficients are obtained for the quantization operation unit 302 of FIG. 4 in a certain scanning sequence such as a zigzag scanning sequence. At the same time, location basis information $P_{i,j}$ that indicates a location in a 8×8 matrix corresponding to a current orthogonal transformation coefficient is also used as process location information for the judge unit 22. Here, location basis information $P_{i,j}$ in a zigzag scanning sequence is converted into a different scanning sequence such as raster scanning. The converted location information is used in the judge unit 22 as process location information $T_{i,j}$.

At Step S2, the judge unit 22 determines which location/area information corresponds to the current process location information $P_{i,j}$ as shown in FIG. 5 or $T_{i,j}$ as shown in FIG. 15 and sends to a scale factor first selection device 24 a first judge signal representing the location/area information.

At Step S3, the scale factor first selection device 24 selects a scale factor according to the first judge signal and sends the selected scale factor to the multiplying and clipping processing unit 30.

The steps after this point are the same as those of the quantization processes of the prior art.

At Step S4, the multiplying and clipping processing unit 20 multiplies the selected scale factor by data of the quantization table. After the product is clipped by data of the quantization table, the result is sent to the quantization operation unit 302 as quantization basis information.

At Step S5, in the quantization operation unit 302, a prior art quantization process is performed using the quantization basis information. Then, quantized coefficients are subject to a Huffman coding process, and the result is stored in the memory device as compressed image data.

Figure 24:
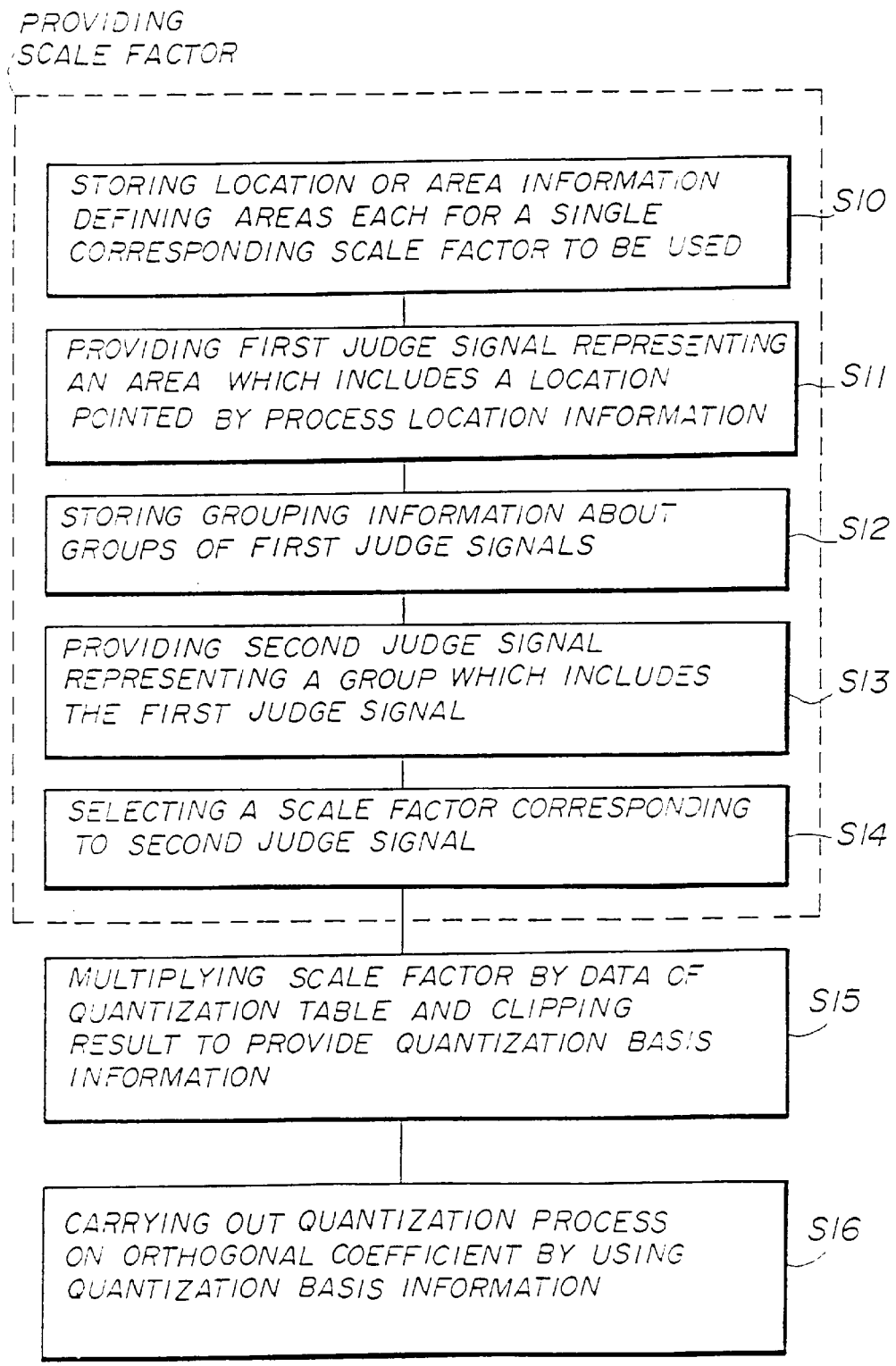
FIG. 24 is a flow chart of the operation of the quantization device of FIG. 4 using the scale factor supplying unit of FIG. 12.

FIG. 24 shows an operation of the quantization device 100 using the scale factor supplying unit 20 shown in FIG. 12. At Step S10, the location/area information storage device 21 of FIG. 12 stores location/area information which defines an area for which a single corresponding scale factor is to be applied.

At Step S11, the judge unit 22 outputs a first judge signal indicating an area which includes the location specified by the process location information.

At Step S12, the grouping information storage device 26 stores grouping information on groups of consolidated first judge signals.

At Step S13, the grouping device 25 provides a second judge signal representing one of the groups which includes the first judge signal from the step 12.

At Step S14, the scale factor second selection device 27 selects a scale factor corresponding to the second judge signal.

Steps S15 and S16 following the step S14 are respectively the same as Steps 4 and 5 of FIG. 23 and will not be further described.

In the above-described quantization device, a scale factor is changed even within one process block depending on characteristics of each portion of the image data so that an optimal compression rate is achieved. If a quantization table contains high compression rates, a high quality image is obtained by reducing the compression rates. On the other hand, if the quantization table contains low compression rates, a high quality image is obtained by increasing the compression rates. While using a small number of quantization tables, this quantization device can deliver a quantization process of a highly optimal performance. Thus, a high performance image data transmission at a substantially constant rate is achieved.

Figure 25:
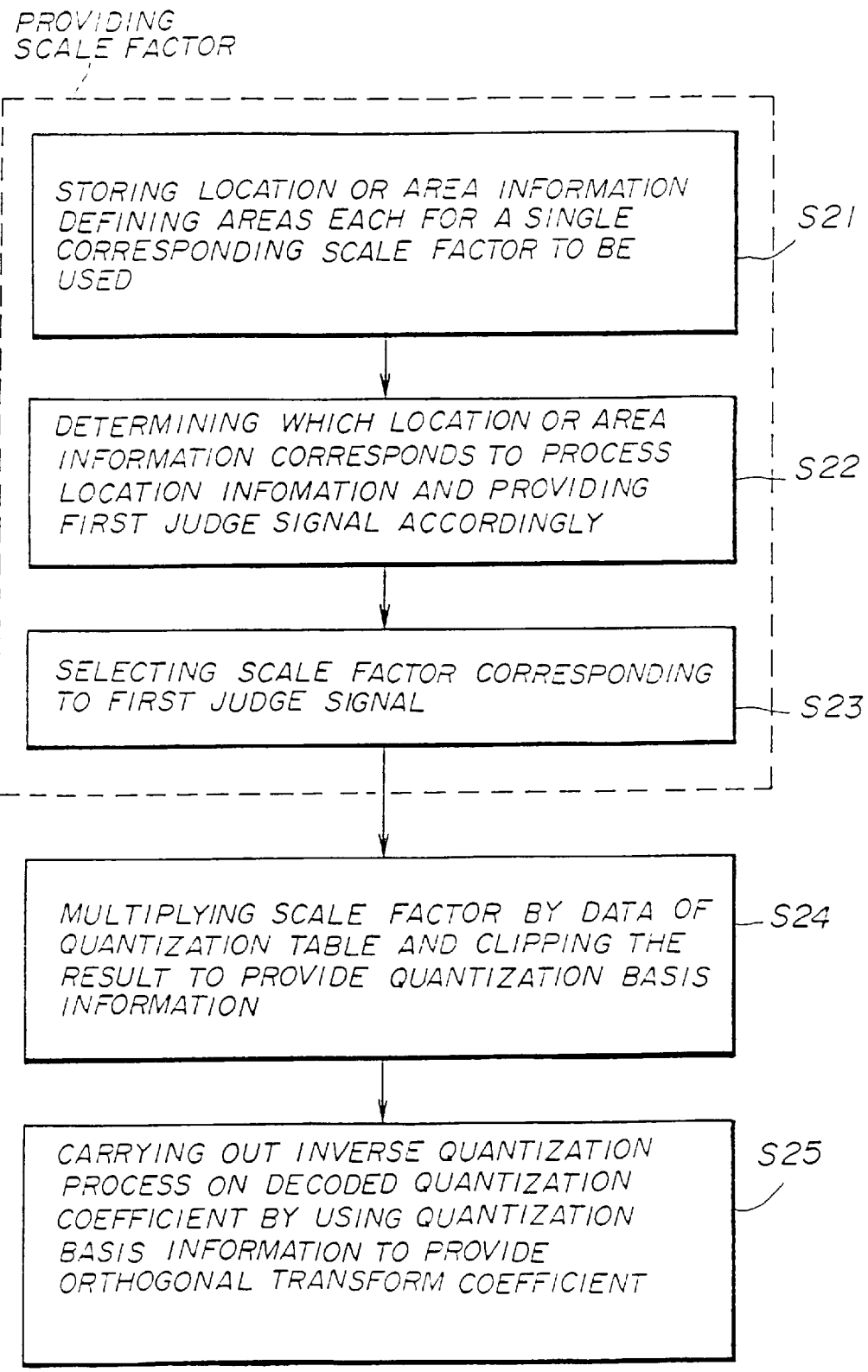
FIG. 25 is a flow chart of the operation of the inverse-quantization device of FIG. 19 using the scale factor supplying unit of FIG. 5.

FIG. 25 illustrates an operation of the inverse-quantization device 50 of FIG. 19 using the scale factor supplying unit shown in FIG. 5. Similarly, FIG. 26 illustrates an operation of the inverse-quantization device 50 of FIG. 19 using the scale factor supplying unit shown in FIG. 12.

Compressed image data read from the memory device is subject to a Huffman decoding process to obtain quantization coefficients of an 8×8 matrix. These coefficients are provided for the inverse-quantization device 50, for example, in a zigzag scanning sequence in the same manner for the quantization device 10. The scale factor supplying unit 20 of the inverse-quantization device 50 uses process location information indicating a location of the decoded quantization coefficients in the 8×8 matrix. Here, location basis information may be converted into a process location information by the process location conversion device 30 as shown in FIG. 20 for the scale factor supplying unit 20 of the inverse-quantization device 50.

In both FIGS. 25 and 26, an operation of providing a scale factor which is denoted by a dotted-line frame is the same as that of the quantization device 10 as described above and will not be further described.

At Step 24 of FIG. 25, the multiplying and clipping processing device 301 of FIG. 19 multiplies a scale factor by specified data stored in the quantization table memory 303 and clips the result to provide quantization basis information.

At Step S25 of FIG. 25, the decoded quantization coefficients are subject to a prior art inverse-quantization process in which the quantization basis information is used. Orthogonal transformation coefficients are outputted from the inverse-quantization device 50.

Steps S36 and S37 of FIG. 26 are respectively the same as Steps S24 and S25 of FIG. 25 and will not be further described.

The above-described inverse-quantization device performs an inverse-quantization process on the quantization coefficient provided by the quantization device. Accordingly, if a quantization table contains high compression rates, a high quality image is obtained by reducing the compression rates. On the other hand, if the quantization table contains low compression rates, a high quality image is obtained by increasing the compression rates.

In the above description, a process block has been treated as having an 8×8 pixels, but is not limited to this configuration.

As described above, according to the present invention, scale factors are changed depending on a location or an area within a single process block, each location or area having different significance of the image data. Thus, an image quality obtained by using a low compression-rate quantization table while partially increasing the compression is equivalent to that of using a high compression-rate quantization table. Even with a small number of quantization tables, a quantization process operating at the nearly optimal performance can be realized. Accordingly, high quality data transmission with a constant compression rate or an approximate constant compression rate can be implemented. The present invention is not limited to these embodiments, but various variations and modifications may be made without departing from the scope of the present invention. The scope of the protection of the following claims is not intended to be limited to the specific embodiments disclosed above.

What is claimed is:

1. A quantization device for quantizing image data, comprising:

a scale factor supplying unit for selecting a scale factor from a plurality of predetermined scale factors at a time based upon process location information indicating a location in a matrix of first coefficients, said matrix of said first coefficients representing a portion of the image data, said matrix defining a single process block, said selected scale factor for each of said coefficients within said process block corresponding to said process location information;

a multiplying unit for multiplying quantization matrix information by said selected scale factor so as to produce quantization basis information, said quantization matrix information corresponding to said matrix of said first coefficients, said quantization matrix information being threshold values for quantization; and a quantization operation unit for quantizing said first coefficients based upon said quantization basis information to generate second coefficients.

2. The quantization device as claimed in claim 1, wherein said scale factor supplying unit further comprises:

a location/area information storage device for storing location/area information which defines a plurality of areas within said portion, a corresponding one of said scale factors being used for each of said areas;

a judge unit for determining which one of said areas includes a location indicated by the process location information and for generating a first judge signal representing said one of said areas; and a scale factor first selection device for selecting said selected scale factor corresponding to said first judge signal for said multiplying unit.

3. The quantization device as claimed in claim 2, further comprising a scale factor storage device for storing said scale factors, said scale factor storage device being connected to said scale factor first selection device.

4. The quantization device as claimed in claim 1, wherein said scale factor supplying unit further comprises:

a location/area information storage device for storing location/area information which defines a plurality of areas within said portion, a corresponding one of said scale factors being used for each of said areas;

a judge unit for determining which one of said areas includes a location indicated by said process location information and for generating a first judge signal indicating said one of said areas;

a grouping information storage device for storing grouping information for indicating groups of said first judge signals;

a grouping device for generating a second judge signal indicating one of said groups, said one of said groups including said one of said first judge signals, wherein said grouping device is connected to an output of said judge unit and to an output of said grouping information storage device; and a scale factor selection device for selecting said one of said scale factors corresponding to said second judge signal for said multiplying unit.

5. The quantization device as claimed in claim 4, further comprising a scale factor storage device for storing said scale factors, said scale factor storage device being connected to said scale factor selection device.

6. The quantization device as claimed in claim 1, wherein said first coefficients include orthogonal transformation coefficients.

7. The quantization device as claimed in claim 6, wherein said second coefficients include quantization coefficients.

8. The quantization device as claimed in claim 1, wherein said quantization operation unit performs inverse quantization.

9. The quantization device as claimed in claim 8, wherein said first coefficients include decoded quantization coefficients.

10. The quantization device as claimed in claim 9, wherein said second coefficients include transformation coefficients.

11. The quantization device as claimed in claim 6, wherein said orthogonal transformation coefficients and said process location information are provided in a raster scanning sequence.

12. The quantization device as claimed in claim 6, wherein said orthogonal transformation coefficients and said process location information are provided in a zigzag scanning sequence.

13. The quantization device as claimed in claim 1, wherein a location information supplying circuit provides the process location information to said scale factor supplying unit.

14. The quantization device as claimed in claim 13, further comprising:
- a location information supplying circuit for providing location basis information which indicates a location in a matrix of each of said first coefficients; and
- a process location conversion device for converting the location basis information into the process location information by changing a scanning sequence of the location basis information and for providing said scale factor supplying unit with the process location information.

15. The quantization device as claimed in claim 2, wherein the location/area information stored in said location/area information storage device indicates areas which are divided by lines parallel to a diagonal of said matrix, and wherein said first coefficients and said process location information are provided in a zigzag scanning sequence.

16. An image processing device comprising:
- a scale factor supplying unit for selecting a scale factor from a plurality of predetermined scale factors at a time based upon process location information indicating a location in a matrix of orthogonal transformation coefficients, said matrix of said orthogonal transformation coefficients representing a portion of image data, said matrix defining a single process block, said selected scale factor for each of said coefficients within said process block corresponding to said process location information;
- a multiplying unit for multiplying quantization matrix information by said selected scale factor so as to produce quantization basis information, said quantization matrix information corresponding to said matrix of said orthogonal transformation coefficients, said quantization matrix information being threshold values for quantization; and
- a quantization operation unit for quantizing said orthogonal transformation coefficients based upon said quantization basis information to generate quantization coefficients, and
- an inverse-quantization operation unit for inverse-quantizing said quantization coefficients based upon said quantization basis information to generate said orthogonal transformation coefficients.

17. The image processing device as claimed in claim 16, wherein said scale factor supplying unit further comprising:
- a location/area information storage device for storing location/area information which defines a plurality of areas within said portion, a corresponding one of said scale factors being used for each of said areas;
- a judge unit for determining which one of said areas includes a location indicated by the process location information and for generating a first judge signal representing said one of said areas; and
- a scale factor first selection device for selecting said selected scale factor corresponding to said first judge signal for said multiplying unit.

18. A quantization method for image data, comprising the steps of:
- a) selecting one of scale factors at a time based upon process location information which indicates a location in a matrix of first coefficients, said matrix of said first coefficients representing a portion of the image data, said matrix defining a single process block, said selected scale factor for each of said coefficients within said process block corresponding to said process location information;
- b) multiplying quantization matrix information by said selected scale factor in said step a) so as to generate quantization basis information, said quantization matrix information corresponding to said matrix of said first coefficients, said quantization matrix information being threshold values for a quantization; and
- c) performing a quantization process on said first coefficients by using said quantization basis information to generate second coefficients.

19. The quantization method as claimed in claim 18, wherein said step a) further comprises the steps of:
- i) storing location/area information which defines areas for corresponding scale factors to be used;
- ii) generating a first judge signal indicating one of said areas which includes a location specified by the process location information; and
- iii) selecting said one of said scale factors based upon to said first judge signal.

20. The quantization method as claimed in claim 19, wherein said step a) further comprises the step of storing said scale factors between the steps of ii) and iii).

21. The quantization method as claimed in claim 18, wherein said step a) further comprises the steps of:
- i) storing location/area information which defines areas for corresponding said scale factors to be used;
- ii) generating a first judge signal indicating one of said areas which includes a location specified by the process location information;
- iii) storing grouping information on groups of the first judge signals;
- iv) generating a second judge signal indicating one of said groups which includes said first judge signal; and
- v) selecting said one of the scale factors corresponding to said second judge signal.

22. The quantization method as claimed in claim 18, wherein said first coefficients include orthogonal transformation coefficients.

23. The quantization method as claimed in claim 18, wherein said second coefficients include quantization coefficients.

24. The quantization method as claimed in claim 18, wherein said quantization process in said step c) performs inverse quantization.

25. The quantization method as claimed in claim 24, wherein said first coefficients include decoded quantization coefficients.

26. The quantization method as claimed in claim 25, wherein said second coefficients include orthogonal transformation coefficients.

27. The quantization method as claimed in claim 22, wherein said orthogonal transformation coefficients and the process location information are provided in a raster scanning sequence.

28. The quantization method as claimed in claim 22, wherein said orthogonal transformation coefficients and the process location information are provided in a zigzag scanning sequence.

29. The quantization method as claimed in claim 18, further comprising providing the process location information before said step of a).

30. The quantization method as claimed in claim 29, further comprising the steps of:

providing location basis information which indicates a location in a matrix of each of said first coefficients; and converting the location basis information into the process location information by changing a scanning sequence of the location basis information.

31. An image processing method for image data, comprising the steps of:

a) selecting one of scale factors at a time based upon process location information which indicates a location in a matrix of first coefficients, said matrix of said first coefficients representing a portion of image data, said matrix defining a single process block, said selected scale factor for each of said coefficients within said process block corresponding to said process location information;

b) multiplying quantization matrix information by said selected scale factor in said step a) so as to generate quantization basis information, said quantization matrix information corresponding to said matrix of said first coefficients, said quantization matrix information being threshold values for a quantization; and c) performing a quantization process an said first coefficients by using said quantization basis information to generate second coefficients, and d) performing an inverse quantization process on said second coefficients by using said quantization basis information to generate said first coefficients.

* * * * *

UNITED STATES PATENT AND TRADEMARK OFFICE
CERTIFICATE OF CORRECTION

PATENT NO.   : 5,923,787
DATED        : July 13, 1999
INVENTOR(S)  : Junichi Hara and Tadanori Ryu It is certified that error appears in the above-identified patent and that said Letters Patent is hereby corrected as shown below:

On the title page, item [63], please change "08/308,283" to --08/308,281--.

Signed and Sealed this

Twenty-first Day of December, 1999

Attest:

Q. TODD DICKINSON

*Attesting Officer*         *Acting Commissioner of Patents and Trademarks*